United States Patent Office 3,584,023
Patented June 8, 1971

3,584,023
ACETOXYALKYLACETOXYSILANES
Bruce A. Ashby, Schenectady, N.Y., assignor to
General Electric Company
No Drawing. Filed Dec. 5, 1966, Ser. No. 598,967
Int. Cl. C07f 7/08, 7/18
U.S. Cl. 260—448.2B     3 Claims

ABSTRACT OF THE DISCLOSURE

An omega-acetoxyalkylacetoxysilane having the formula:

(1) 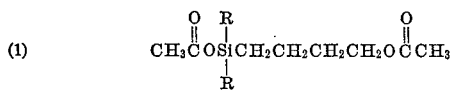

where R is a monovalent hydrocarbon radical. The novel compounds are intermediates for resins useful as insulators of electrical conductors.

---

This invention relates to a new class of materials comprising omega-acetoxybutylacetoxysilanes having the formula:

(1) 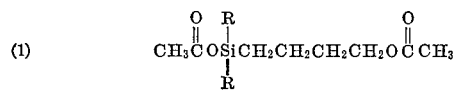

where R is a monovalent hydrocarbon radical, preferably methyl or phenyl.

The acetoxybutylacetoxysilanes of the present invention are extremely useful compositions in that they contain acetoxy groups of two different reactivities so that the compound can be converted from the initial acetoxy state to heretofore unattainable substituted organosilicon compounds. For example, since the silicon-bonded acetoxy radical is considerably more reactive than the acetoxy radical attached to the acetoxybutyl group, the silanes of the present invention can be reacted with a first material through the silicon-bonded acetoxy groups and then to a second material through the carbon-bonded acetoxy group. For example, the compositions within the scope of Formula 1 can be reacted with silanol chain-stopped polysiloxanes to produce acetoxybutyldimethylsiloxy chain-stopped siloxanes which can be further reacted with polybasic acids to produce a polyester resin useful in many industrial applications, such as in forming conventional laminates for glass fiber materials.

The compositions within the scope of the present invention can be prepared by effecting reaction between a 2,2-dihydrocarbon-1-oxa-2-silacyclohexane having the formula:

(2) 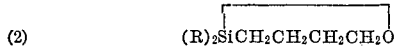

and acetic anhydride in the presence of zinc chloride. The reaction is effected by merely heating the silacyclohexane of Formula 2 with the acetic anhydride in the presence of a catalytic amount of zinc chloride.

Since the reaction involves one mole of the silacyclohexane and one mole of acetic anhydride, it is preferred to conduct the reaction employing equimolar amounts of each material and with the zinc chloride being present in an amount equal to from about 0.01 to 1.5 percent by weight, based on the weight of the other components of the reaction mixture. Since the silacyclohexanes are liquids and since the reaction can be carried out readily at a temperature above the solution temperature of zinc chloride, it is preferred to employ elevated temperatures, for example, from 100 to 250° C., at which temperature the reaction proceeds at a satisfactory rate. While the reaction can be carried out in the presence of suitable solvents, no particular need is seen for the use of solvents and no particular benefit is obtained thereby.

Employing equimolar amounts of the reaction mixture at a temperature of 215° C., it is found that the reaction goes to substantial completion in about one hour. While there is no disadvantage to employing an excess of either reactant, no particular advantage is gained thereby and the use of other than equimolar proportions increases the complications of isolating the desired product.

After the reaction between the silacyclohexane and the acetic anhydride is completed, the desired product is isolated by fractional distillation.

The silacyclohexanes employed in the practice of the present invention are known in the art and are described, for example, in Pat. No. 2,983,744—Knoth, Jr., and Pat. No. 3,083,219—Anderson.

The following examples are illustrative of the practice of my invention and are not intended for purposes of limitation.

EXAMPLE 1

To a recation vessel was charged 65 g. (0.5 mole) of 2,2-dimethyl-1-oxa-2-silacyclohexane, 51 g. (0.5 mole) of acetic anhydride, and 0.5 g. of fused zinc chloride. After one hour, the desired product was fractionally distilled to produce 79 g. (68% yield) of dimethylacetoxybutylacetoxysilane which is within the scope of Formula 1 when R is methyl. This material had a boiling point of 118° C. at 4.2 mm. Infrared analysis was consistent with the expected structure and chemical analysis showed the presence of 25.5% silicon-bonded acetoxy groups as compared with the theoretical value of 25.4%.

EXAMPLE 2

Following the procedure of Example 1, but starting with 0.5 mole of 2,2-diphenyl-1-oxa-2-silacyclohexane, a product within the scope of Formula 1 is obtained in which R is phenyl.

EXAMPLE 3

To a reaction vessel is added 900 g. of a 25 centistoke silanol chain-stopped dimethylpolysiloxane and 225 g. of dimethylacetoxybutylacetoxysilane prepared as in Example 1. This reaction mixture is maintained at a temperature of 50° C. and under a pressure of 10 mm. for 5 hours while the silicon-bonded acetoxy groups condense with the silanol groups of the polysiloxane to produce new siloxane linkages and while acetic acid formed in the reaction evaporates. To the reaction mixture is then added 500 g. of mixed cresols and 165 g. of terephthalic acid and the reaction mixture is again maintained at 100° C. at a pressure of 100 mm. for 8 hours. During this time, the acetoxy groups attached to the butyl radicals are replaced by the carboxyl groups of terephthalic acid to form a high molecular weight linear polyester resin. This resin is purified by stripping the cresol solvent to produce a film-forming material, the films of which are useful for the insulation of electrical conductors.

What I claim as new and desire to secure by Letters Patent of the United States is:

1. An omega-acetoxyalkylacetoxysilane having the formula:

(1) 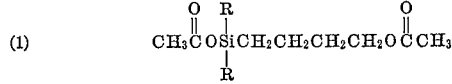

where R is a monovalent hydrocarbon radical.
2. The silane of claim 1 in which R is methyl.
3. The silane of claim 1 in which R is phenyl.

(References on following page)

References Cited

UNITED STATES PATENTS

| | | | |
|---|---|---|---|
| 3,494,950 | 2/1970 | Simmler et al. | 260—448.2B |
| 3,338,869 | 8/1967 | Haluska | 260—448.2X |
| 2,872,434 | 2/1959 | Barnes | 260—448.2X |
| 2,983,745 | 5/1961 | Speier | 260—448.2 |
| 3,109,012 | 10/1963 | Rossmy et al. | 260—448.2 |
| 3,162,663 | 12/1964 | Beck | 260—448.2 |
| 3,371,104 | 2/1968 | Rossmy et al. | 260—448.2X |

TOBIAS E. LEVOW, Primary Examiner

P. F. SHAVER, Assistant Examiner

U.S. Cl. X.R.

260—824, 860, 46.5, 448.2; 252—63.7